United States Patent [19]
Klees

[11] 3,779,282
[45] Dec. 18, 1973

[54] ANNULUS INVERTING VALVE

[75] Inventor: Garry W. Klees, Mercer Island, Wash.

[73] Assignee: The Boeing Company, Seattle, Wash.

[22] Filed: Nov. 8, 1971

[21] Appl. No.: 196,422

[52] U.S. Cl............ 137/625.46, 60/226 R, 138/115
[51] Int. Cl............................................. F16k 11/06
[58] Field of Search................. 137/625.46, 625.47; 60/226 R, 262, 264, 319, 39.23, 39.5, 244; 138/111, 115, 114

[56] References Cited
UNITED STATES PATENTS

| | | | |
|---|---|---|---|
| 1,785,403 | 12/1930 | Babb.................................. | 138/115 |
| 2,934,895 | 5/1960 | Gregory et al........................ | 60/244 |
| 2,947,139 | 8/1960 | Hausmann ......................... | 60/264 X |
| 2,978,865 | 4/1961 | Pierce................................. | 60/262 X |
| 3,053,283 | 9/1962 | Allen et al. ......................... | 138/111 |
| 3,070,131 | 12/1962 | Wheatley............................. | 138/115 |
| 3,117,750 | 1/1964 | Snell.................................. | 60/226 X |
| 3,136,965 | 6/1964 | Lunden........................... | 138/114 X |
| 3,537,485 | 11/1970 | March.............................. | 138/111 X |
| 3,631,678 | 1/1972 | Reed................................ | 60/39.5 X |
| 3,673,803 | 7/1972 | MacDonald....................... | 60/226 R |

Primary Examiner—Samuel Scott
Attorney—Glenn Orlob et al.

[57] ABSTRACT

A flow control system for inverting the positions of two adjacent constant area flow patterns within the confines of a fluid passageway having an area substantially equal to the combined area of the two separated flow patterns. The preferred embodiments involve annular first and second duct means divided into duct elements shaped and arranged such that two annular flow patterns are discharged at the exit end of the passageway in an inverted adjacent concentric relationship to that which exists at the entrance end of the passageway. Valve embodiments for optionally causing either inverted or straight through flow are also presented.

23 Claims, 29 Drawing Figures

ANNULUS INVERTING VALVE

FIELD OF THE INVENTION

This invention relates to control of fluid flow within a passageway; and more particularly, to apparatus for dividing flow into two adjacent duct means and for inverting or reversing the relative positions of the two duct means between the entrance and exit ends of the passageway while maintaining a constant cross-sectional area for each duct means.

BACKGROUND OF THE INVENTION

In annular fluid passageways it is sometimes desirable to divide the total flow into two separated flow patterns and then to invert, or cross-over, these flow patterns along the length of the annular passageway. For example, in annular passageways associated with aircraft jet engines, the separation of air into such individually controlled inverted flow patterns would allow improved management of the quantities of air which are routed to or from such elements as the first stage fan or compressor, the auxiliary intake passageway, the second stage fan, and the fan exhaust nozzle. The problem in the past has been that with known techniques, it has not been possible to divide the total area of an annular passageway into two such flow patterns and then to invert, or cross, the flow patterns without resorting to duct structure extending outside of the original space envelope of the annular passageway, or resorting to the expedient of necking down or reducing the areas of each flow pattern duct in the cross-over region. In aircraft engines, an increase in the size of the annular passageways, and hence the size of engine cowling, is highly undesirable because of increased aerodynamic drag. Necking down or reducing the areas of the ducts in the cross-over region is also unsatisfactory because of prohibitive flow efficiency losses.

OBJECTS OF THE INVENTION

Accordingly, it is the primary object of this invention to teach the construction and shaping of a flow control passageway system in which the total flow may be divided into two separate equal or unequal constant area duct means having a combined total cross-sectional area substantially equal to the cross-sectional area of the original passageway, and in which the two duct means may be inverted or crossed-over to opposite sides of the passageway to discharge their respective flows at the exit end in an inverted relationship to that which existed at the entrance end.

A related object of this invention is to teach the construction of an annular passageway system in which the entire flow is divided into concentric inner and outer annular areas at the entrance end, communicated through the interior of the passageway in separate constant area duct means, and discharged at the exit end in an inverted concentric inner and outer relationship to that which existed at the entrance end.

A further object of this invention is to teach the construction of an annulus inverting valve by the use of two equal area annular passageway systems longitudinally sectioned into separate, relatively moveable, forward and aft portions which may be positioned to either invert the flow as previously described, or to pass the flow directly through the passageway, thereby providing a means for switching from inverted to straight through flow.

A further related object of this invention is to teach an arrangement of wall structure within a passageway to create a plurality of conformably nesting flow ducts which collectively form first and second duct means; said first duct means having a cross-section at its entrance end which extends from one side to the middle of the passageway; said second duct means having a cross-section at its entrance end which extends from the other side of said passageway to the middle where it nests with said first duct means, said first and second duct means each being shaped and arranged to maintain a substantially constant flow area while directing the flow through an exit cross-section which is located such that it extends from the opposite side of the passageway from that of its entrance cross-section.

SUMMARY OF THE INVENTION

These and other objects of this invention have been achieved in the preferred embodiment of this invention wherein a passageway has been divided into two constant area duct means, each of which includes a plurality of equal area basic duct elements nested together and extending longitudinally between one end and the middle of the duct means. Each basic duct element has been provided with a unique constant area shape characterized by a smooth transition from a generally rectangular entrance cross-section extending from one side partially across the passageway, to an intermediate generally triangular section, and then to a generally rectangular section extending directly across the passageway at the middle of the duct means. Since each basic duct element has an identical rectangular cross-section extending entirely across the passageway, a second and similar element may be longitudinally mated at that section to continue the flow of fluid to an exit cross-section located on the opposite side of the passageway from the entrance end cross-section. In this manner, flow is taken from one side of a flow passageway and inverted or crossed-over to the opposite side without interference, necking down or departure from the confines of the space envelope of the original passageway. The inverting flow control system just described is advantageously made to function as a valve means for switching from inverted to straight through flow merely by sectioning the system into relatively moveable upstream and downstream portions which can be selectively positioned to align appropriate rectangular sections of the duct elements at the middle of the passageway.

DESCRIPTION OF THE PREFERRED EMBODIMENTS

Figure 1:
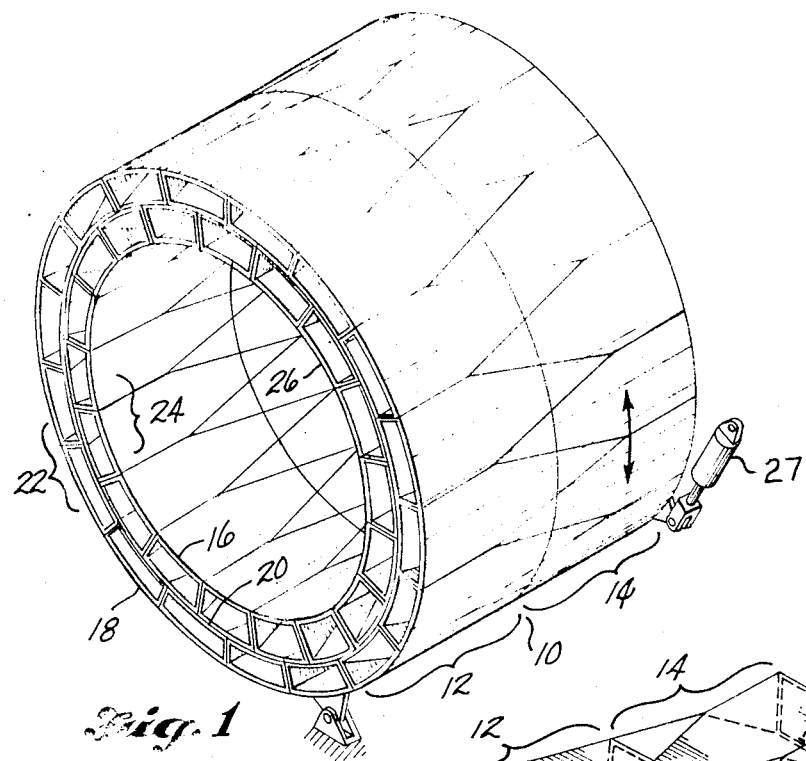
FIG. 1 is an isometric view of an annulus inverting valve passageway flow control system of the invention positioned for flow inversion.

FIG. 1, depicts an annulus inverting valve 10 constructed of passageways shaped and arranged according to this invention. The valve 10 is sectioned into relatively moveable forward and aft portions 12 and 14 each bounded by an inner side 16 and an outer side 18 of an annular passageway. At the entrance end of the valve (near side as shown), wall structure 20 separates the passageway into a first duct means 22 having an annular entrance configuration, and a second duct means 24 having an annular configuration concentric with, and inside of, the first duct means 22. Each of the first and second duct means 22 and 24 are divided into a plurality of individual basic duct elements 26. An actuator 27 in combination with the fixed pin restraint shown provides a means for causing selective rotation of aft portion 14 with respect to forward portion 12. As will become more apparent in the discussion which follows, the basic duct element 26 shown in FIG. 2 may be appropriately reoriented, nested or joined with other such elements to allow flow to be controlled within an annular fluid passageway in a novel manner. For purposes of simplicity in describing the concepts of the invention, the duct elements 26 are shown to resemble individual building blocks, each having its own exterior wall structure. However, it should be understood that this is for purposes of illustration only, and that in most practical applications of the invention, adjacent duct elements will utilize single common walls formed within a passageway. Also, it will be noted that FIGS. 2 through 8 each show duct elements having straight line segments, or segments having an infinite annular radius, for ease of portrayal. While the inventive concepts have utility in straight line ducting work, to date the most important practical applications relate to true annular valve and passageway configurations. In the discussion which follows, straight line terminology is used for ease of description. However, this terminology should be interpreted to cover all equivalent annular or curved sections. For example, the generally rectangular sections illustrated, discussed, and claimed, should be considered to be equivalent to similarly sized sectors of an annulus having curved concentric sides.

Figure 2:
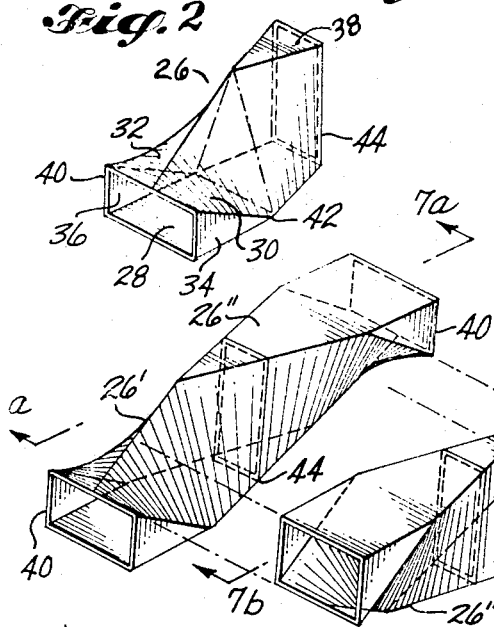
FIG. 2 is a detailed expanded view of one of the basic duct elements used in FIG. 1, shown here with an infinite annular radius for ease of portrayal.

Referring now to FIG. 2, the basic duct element 26 can be seen to have a first wall surface 28; oppositely facing symmetrically disposed second wall surfaces 30, 32 and third wall surfaces 34, 36; and an opposite wall surface 38. These wall surfaces define at the entrance end (near side) a generally rectangular duct cross-section 40 having one of its long sides formed by the first wall surface 28 and extending partially across the passageway in a direction perpendicular to the first wall surface 28. As is more fully shown in the cross-section schematic view of FIG. 8, the basic duct element 26 maintains a constant duct area and the wall surfaces 30, 32 provide a smooth gradual transition from the entrance rectangular section 40 to an intermediate triangular section 42, and then to a generally rectangular section 44 which extends vertically across the passageway at the opposite end of the basic duct element 26. The first wall surface 28 forms a long side of rectangular section 40, one side of triangular section 42, and a short side of rectangular section 44 at the opposite end of the element 26. The smooth gradual transition between each of the defined sections has been accomplished by shaping second wall surfaces 30, 32 to create a uniformly varying curvature for the walls of the passageway.

Figure 3:
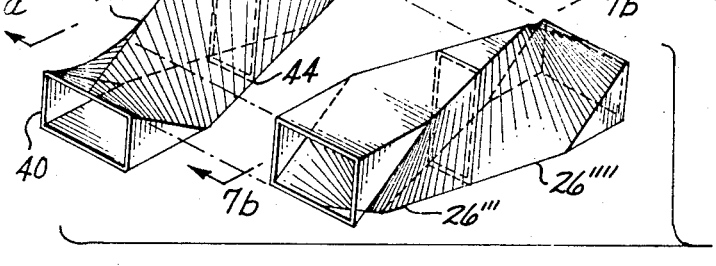
FIG. 3 is an exploded view of two individual adjacent duct means each comprising a pair of mated basic duct elements. The left duct means will invert flow from bottom to top, and the right duct means from top to bottom, respectively, as shown.

FIG. 3 is an exploded isometric view of two next adjacent individual duct means each comprising a mated pair of basic duct elements 26, of the type shown in FIG. 2. Basic duct element 26' is identically disposed to the FIG. 2 element 26 and joined at its rectangular section 44 to a second element 26'' which has been rotated and inverted from the FIG. 2 position. It will readily be apparent that flow entering rectangular section 40 of duct element 26' will be communicated through the mated rectangular sections 44 into duct element 26'' and hence out of rectangular section 40 at the opposite end of the element 26''. Accordingly, when the duct system 26', 26'' is installed in a fluid passageway, the flow will be forced to enter a rectangular section extending partially across the passageway, pass through a rectangular section extending entirely across the passageway, and exit through a rectangular section which extends partially across the passageway from the opposite side of the passageway from that of the entrance end. In this manner, a first duct means is provided for inverting flow from the lower to the upper side of the passageway.

In a similar fashion in FIG. 3 adjacent elements 26''' and 26'''' are mated together but rotated longitudinally such that they will conformably nest with elements 26' and 26'' while providing a constant area second duct means for inverting flow from the upper to the lower side of the passageway.

Figure 4:
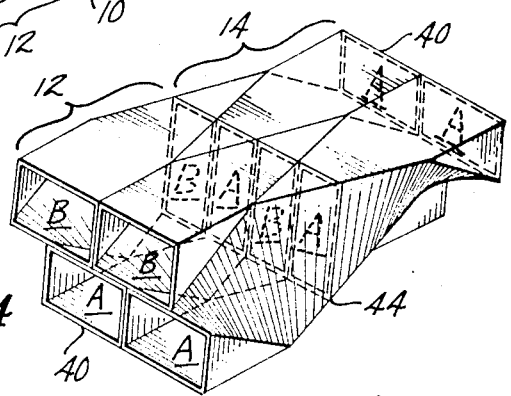
FIG. 4 is a detailed isometric view of four adjacent duct means each comprising forward and aft basic duct elements aligned for flow inversion.

FIG. 4 shows a nested cluster of duct means of the type shown in individual detail in FIG. 3, conveniently sectioned into relative moveable forward and aft portions 12 and 14 which interface at the intermediate rectangular sections 44. With the forward and aft portions positioned as shown, flow inversion will take place. A first duct means A is located at the entrance end of the passageway adjacent to and below a second duct means B. As has been previously discussed, each of the duct means will receive flow from one side of the passageway and communicate it to the opposite side at the exit end. It will be noted that while individual nested ducts having individual walls are shown here for purposes of illustration, that as mentioned earlier, most practical embodiments of the invention will utilize single walls, the opposite sides of which form boundary walls for adjacent ducts.

Figure 5:
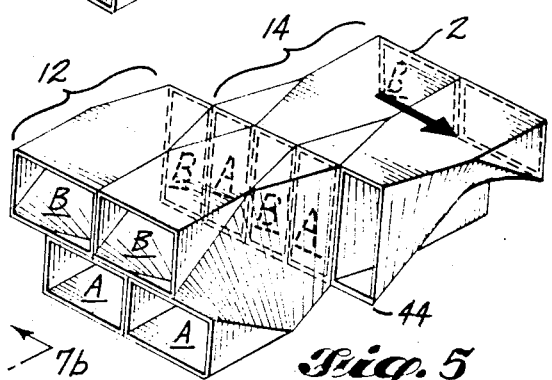
FIG. 5 corresponds to FIG. 4 with the forward and aft basic elements shifted and realigned for straight through flow.

FIG. 5 shows the system of FIG. 4 wherein the relatively moveable portions 12 and 14 have been displaced such that next adjacent sections 44 have been aligned to form new duct means which will pass the flow straight through the passageway between entrance cross-sections and exit cross-sections which are similarly disposed on the same sides of the passageway. Accordingly, a simple mechanical device for laterally displacing either the forward or the aft portion 12 or 14 will provide means for switching from inverted to straight through flow. The relative positions of the basic duct elements 26 for the straight through mode of operation are displayed more clearly in FIG. 6.

Figure 6:
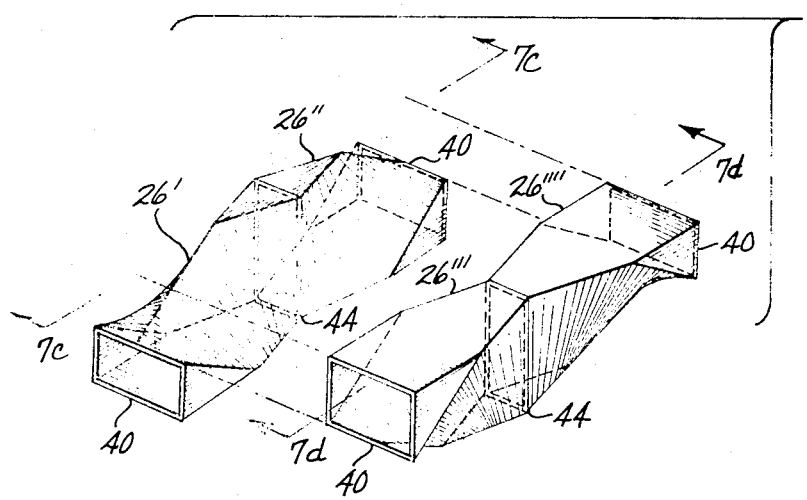
FIG. 6 is similar to FIG. 3 except that each pair of basic duct elements have been shifted and mated for straight through flow.

FIG. 6 shows a pair of basic duct elements 26' and 26" mated at their rectangular sections 44 to form a duct means which receives flow from a lower entrance section 40, communicates it through element 26" and out of the passageway through an exit section 40 located on the same side of the passageway. Similarly, the adjacent duct means formed by mated elements 26''' and 26'''' directs flow received from an upper entrance section 40 out of the passageway through an upper exit section 40 located on the same side of the passageway as that of the entrance section.

Figure 7A:
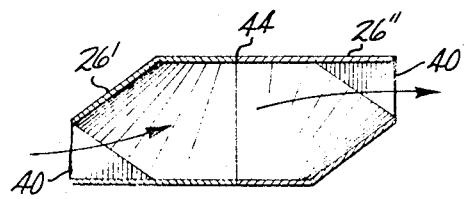
FIG. 7a is a cross-section view through the first duct means of FIG. 3.
Figure 7C:
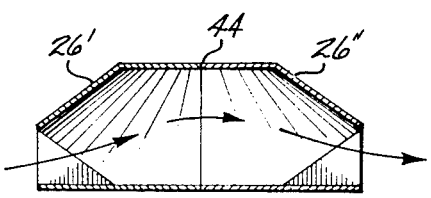
FIG. 7c is a first duct means cross-section taken from FIG. 6.
Figure 7B:
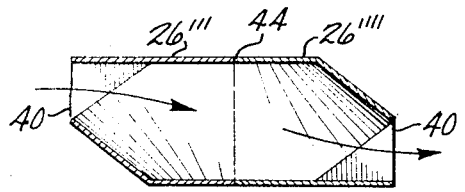
FIG. 7b is a cross-section view through the second duct means of FIG. 3.

FIGS. 7a, 7b, 7c, and 7d are cross-sectional views taken at designated locations in FIGS. 3 and 6. FIGS. 7a and 7b illustrate the flow paths for the individual next adjacent duct means of FIG. 3 when the disclosed system is used for flow inversion. The flow inversion system of this invention has been found to have utility without the means for switching to straight through flow. Accordingly, when switching is not desired, the basic elements 26', 26" and 26''', 26'''' can be made integral or permanently connected at interface 44, in which case the basic building block ducts of the system will involve mated pairs of elements 26, joined as in FIGS. 3, 7a and 7b. It will be noted that if flow switching is not desired that there will be no requirement for equal sized intermediate sections 44. Accordingly, the first and second duct means may be of unequal constant cross-sectional areas, thereby dividing the total flow into unequal portions if desired for a specific application. Also, as noted earlier, it should be borne in mind that in a practical system a single wall will be shared by next adjacent duct elements.

Figure 7D:
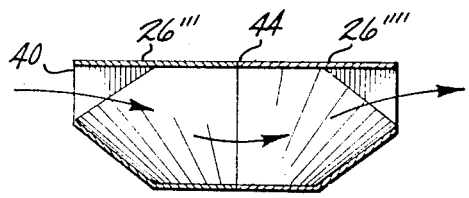
FIG. 7d is a second duct means cross-section taken from FIG. 6.

FIGS. 7c and 7d illustrate flow paths for straight through flow when the invention is used with means for switching from and to inverted flow. It should be noted that in either the inverted or straight through flow modes of operation, the constant area duct means of this invention have been tested to show surprisingly high, and for most applications very satisfactory, flow efficiencies and drag parameters. Test specimens have utilized internal wall surfaces of controlled smoothness and so far as practical, longitudinally constant changes of curvature to prevent flow separation.

Figure 8:
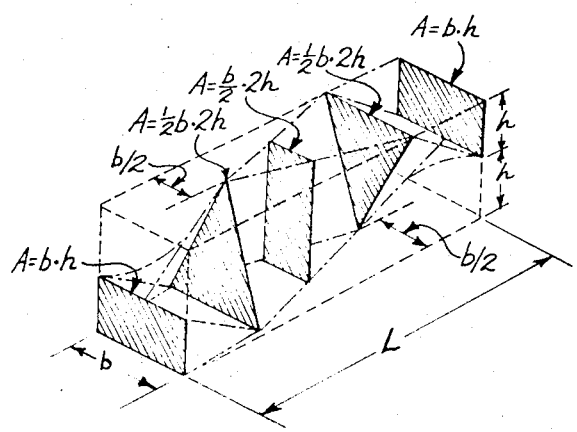
FIG. 8 is a schematic showing of the longitudinal cross-sectional shapes of an individual duct means positioned for inversion of flow.

FIG. 8 is a schematic illustration of the unique primary cross-sectional shapes involved in a single constant area duct means made up of two basic duct elements 26, disposed and joined for flow inversion. For convenience in illustration and description, the overall passageway space envelope is shown as a rectangular prism having the dimensions $b$, $2h$, and $L$. The entrance or first section, at the lower end as shown, is a laterally elongated rectangle extending from the lower side partially across the passageway and having an area: $A = b \cdot h$. The next or second defined cross-section is a triangle having a base on the lower side and extending to an apex on the upper side of the passageway and having the same area: $A = \frac{1}{2}b \cdot 2h = bh$. The middle or third section is a vertically elongated rectangle extending from the lower side to the upper side of the passageway and having the same area: $A = b/2 \cdot 2h = bh$. This third section would correspond to an interface section 44 in terms of the previously described basic duct elements 26, and hence would be the section at which the two basic duct elements 26 are joined. This joined section would normally occur at ½ L or the mid-length of the duct means. However, it will be recognized that, if desired, either of the basic duct elements may be lengthened or shortened to cause the interface section to fall in another location without departing from the concepts that have been disclosed. Testing to date has shown that excellent flow efficiency can be achieved with duct length to height ratios as low as $L/2h = 4.0$. The next adjacent upstream, or fourth, section is a triangle having a base on the upper side and extending to an apex on the lower side of the passageway, and having the same area: $A = \frac{1}{2} b \cdot 2h = b \cdot h$. The exit, or fifth, section involves a laterally elongated rectangle extending from the upper side partially across the passageway and having the same area: $A = b \cdot h$. Each of the defined primary sections and all intermediate sections have the same area, viz. $A = b \cdot h$. Accordingly, the duct means of FIG. 8 will invert flow while maintaining a constant area along its length.

As discussed previously, the straight line segments shown in FIGS. 2 through 7 and 7a through 7d are to be considered fully equivalent to corresponding curved or annular elements. For example, the following terminology would be directly equivalent: "lower" and "upper" corresponds to "inner" and "outer"; "laterally elongated rectangle" corresponds to "circumferentially elongated sector of an annulus"; "vertically elongated rectangle" corresponds to "radially elongated sector of an annulus"; and "above" or "below" corresponds to "closer to" or "farther from" the longitudinal axis of an annular section: Other comparative equivalents will readily occur to persons skilled in the mechanical arts.

Figure 9:
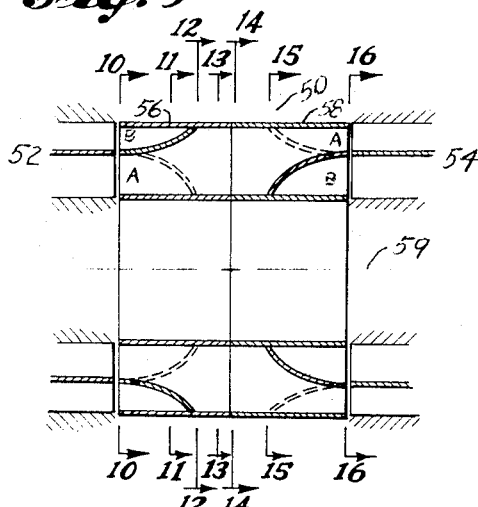
FIG. 9 is a side elevation cross-section view of a 16 passageway valve embodiment positioned for flow inversion.

FIG. 9 is a side elevation full-section view of a 16 duct element valve embodiment of the invention. The valve 50 extends between and connects annular passageways 52 and 54, and is divided at center section 14—14 into a forward portion 56, and an aft portion 58. The valve will be provided with a means for causing a relative rotation between the forward and aft portions, such as was shown in FIG. 1 at 27, to thereby allow switching between inverted and straight through flow in the manner discussed in connection with the previous figures.

Figure 10:
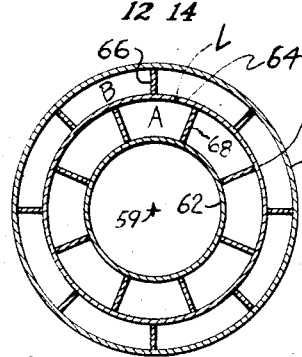
FIGS. 10 through 16 are successive cross-sections from FIG. 9 taken as noted in FIG. 9.

FIG. 10, taken at 10—10 in FIG. 9, shows the entrance section of the annular valve passageway to be bounded by an outer wall 60, an inner wall 62, and divided by a center wall 64, thereby forming adjacent concentric inner and outer annular portions having a combined cross-sectional area substantially equal to the cross-sectional area of the annular valve passageway. The inner annular portion extending from inner wall 62 to center wall 64 acts as a first duct means A. The outer annular portion between center wall 64 and outer wall 60 acts as a second duct means B for communicating fluid through the valve separate from the fluid carried by first duct means A. Each duct means is divided into eight individual duct elements by the radially extending wall members 66 and 68 which provide common walls for next adjacent duct elements. At the entrance section shown in FIG. 10, it can be seen that each individual duct element has the cross-section of a circumferentially elongated sector of an annulus, and that the duct wall members 66 of first duct means A are arranged in circumferentially staggered positions with respect to wall members 68 of second duct means B. Also, for purposes of explanation in connection with subsequent figures, a locus line L which extends parallel to the longitudinal axis 59 of valve means 50 has been shown in FIG. 10 at the center of a center wall segment 64' between adjacent sets of radially extending wall members 66 and 68.

Figure 11:
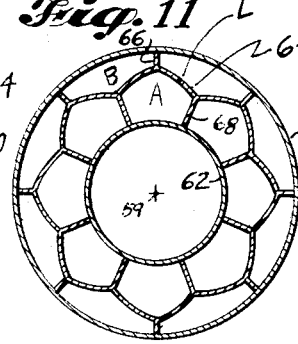

FIG. 11 shows the cross-sectional shapes of the individual duct elements at 11—11 in FIG. 9. The shapes are basically pentagonal with three sides curved, and correspond to the FIG. 8 pentagonal sections located between the rectangular entrance section and the first triangular section. The wall segment 64' has been rotated about locus line L and reshaped such that equal areas are maintained between duct elements of the duct means A and B.

Figure 12:
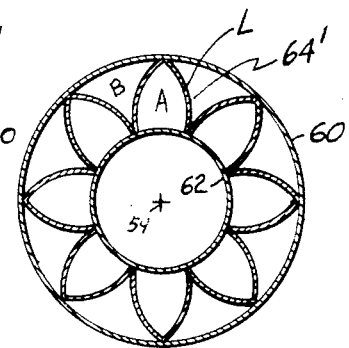

FIG. 12, taken at 12—12 in FIG. 9, shows three-sided duct element sections which are the direct equivalent, in an annular embodiment, of the first triangular section of the FIG. 8 straight line schematic drawing. Wall segment 64' has continued its rotation about locus line L and has been shaped and extended to eliminate wall members 66 and 68.

Figure 13:
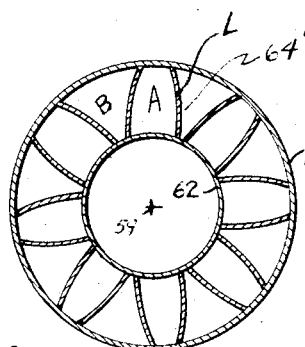

FIG. 13 displays a four-sided duct element wall configuration at 13—13 in FIG. 9 which corresponds to those sections intermediate the first triangular section and the middle rectangular section of FIG. 8. Wall segment 64' has been further rotated about locus line L and reshaped so as to approach a trapezoidal configuration while maintaining constant areas for the duct elements.

Figure 14:
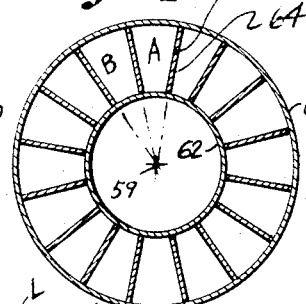

FIG. 14 shows the cross-section existing at the interface valve plane 14—14 in FIG. 9, corresponding to the interface secton 44 of previous figures and the center rectangular section of FIG. 8. Wall segment 64' is further rotated about locus line L and shaped such that it is straight and radially aligned with longitudinal axis 59. Duct elements of the first duct means A and the second duct means B now occupy alternate annular sectors defined by wall segments 64' which extend radially entirely across the annular passageway between outer wall 60 and inner wall 62. The sixteen duct elements between wall segments 64' have equal area identical cross-sections which are segments of an annulus having a circumferential arc of $360°/n$, where $n$ is the number of duct element passageways.

Figure 15:
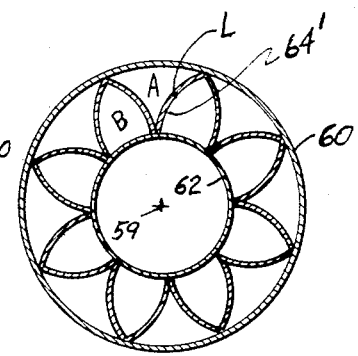

FIG. 15 is taken at 15—15 within aft portion 58 in FIG. 9. Note that 15—15 is located at the same distance from interface plane 14—14 as section 12—12 of forward portion 56. The wall segment 64' has been futher rotated clockwise and shaped to form one side of a three-sided duct element of the type shown in FIG. 12, thereby displaying the same petal-like cross-section shown in FIG. 12. Note however that the FIG. 15 petals appear to be displaced by 1/16th of one rotation with respect to the FIG. 12 petals. This is because the shape of the duct elements of the first duct means (labeled A) have changed in shape from generally triangular with apex outward in FIG. 12 to generally triangular with apex inward in FIG. 15. In each embodiment of this invention, whether it is a fixed flow inversion system or a moveable valve device, corresponding sections spaced equal distances on opposite sides of the central interface plane will display the same cross-sectional shapes. However, when used for flow inversion as shown in these figures, the shapes will appear rotated by $360°/n$ with respect to the corresponding section. In the case of a relatively moveable valve embodiment such as illustrated in FIG. 9, it should now be apparent that interface sections of the forward and aft portions may be realigned by relative rotation of $360°/n$ to thereby cause fluid to pass straight through the valve without flow inversion, in which case corresponding sections on opposite sides of the interface plane will appear to be identically aligned in "mirror image" fashion.

Figure 16:
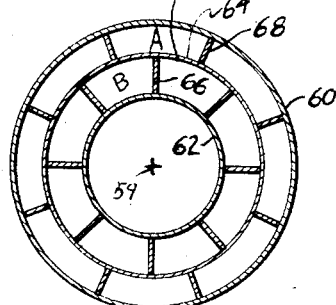

Accordingly, the exit section shown in FIG. 16 is identical in shape but appears rotated by 1/16th of a revolution from the entrance section of FIG. 10 for flow inversion. In FIG. 16 the annular first duct means A surrounds the annular second duct means B. This is an inverted or reversed relationship to that which exists at the entrance section of the valve shown in FIG. 10.

Therefore, the valve means 50 can be seen to provide a flow control system for inverting the separate flow patterns of duct means A and B from the entrance section to the exit section. As noted previously, this has been accomplished within the confines of an annular passageway wherein the first and second duct means have a combined cross-sectional area substantially equal to the cross-sectional area of the passageway. It is noted that in the successive section views of FIGS. 10 through 18, each individual duct element passageway remains symmetrical about a radial plane passing through the longitudinal axis 59 of the valve. For example, the individual duct element passageway marked "A" can be seen to maintain symmetry about a vertical radial plane while shifting radially outwardly from a position along the inner wall 62 in FIG. 10 to a position along the outer wall 60 in FIG. 16. It should also be apparent that the invention provides means for switching from inverted to straight through flow merely by an annular rotation of the forward portion 56 with respect to the aft portion 58 by $360°/n$, or 1/16th of a revolution in this case, to thereby align next adjacent annular sectors at the interface plane.

Figure 17:
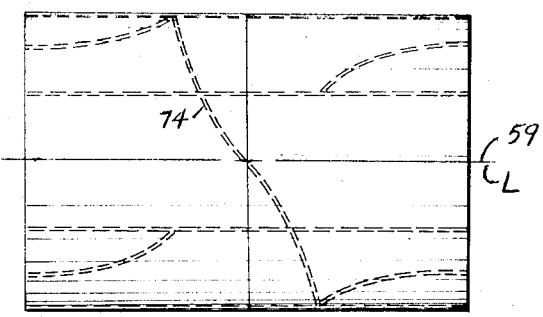
FIG. 17 is a side elevation view of a two passageway valve embodiment positioned for flow inversion.

FIG. 17 is a side elevation view of a two passageway valve embodiment which represents the simplest geometric form of the invention. The embodiment shown utilizes the minimum possible interior wall area to accomplish the flow inversion function. However, it also requires the greatest lateral movement of fluid within the valve, and therefore, for flow efficiency purposes, its length must be markedly increased over those of the multiple passageway embodiments shown in previous figures. As in previous embodiments, the valve 50 is divided into relatively moveable forward and aft portions 56 and 58 at an interface plane 22—22. A locus line L, useful in describing the wall shapes, is in this embodiment also located parallel to the valve longitudinal axis 59.

FIGS. 18 through 26 are each individual cross-sectional views taken from the FIG. 17 side elevation view at successive longitudinally spaced locations as indicated by the numerals corresponding to the figure numbers. In numerical order the figures serve to define the passageway shapes from the entrance end to the exit end of the valve.

Figure 18:
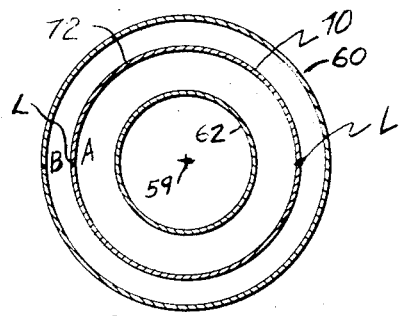
FIGS. 18 through 26 are successive cross-section views from FIG. 17 taken as noted in FIG. 17.

FIG. 18 shows the entrance section of the valve to have an annular first duct means A located inside of and concentric with an annular second duct means B, as defined by a center wall 70, 72 appropriately located outer wall 60 and inner wall 62 to divide the passageway such that the areas of duct means A and B are equal. Locus lines L here shown as two points, are each parallel to the longitudinal axis and located at opposite midpoints of center wall 70, 72.

Figure 19:
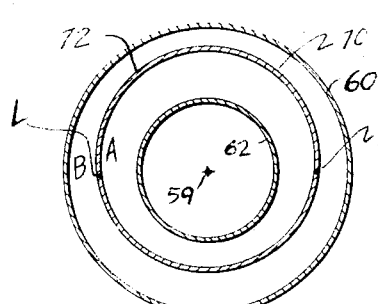

FIG. 19 shows the center wall 70, 72 to have retained its generally circular shape, but to be shifted to a non-concentric position with respect to outer and inner walls 60 and 62, by a minor rotation and reshaping of the center wall 70, 72 about locus lines L.

Figure 20:
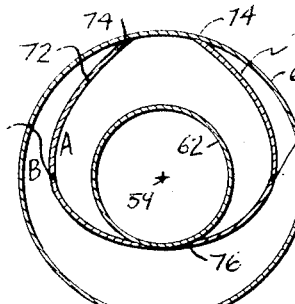

FIG. 20 shows that the center wall 70, 72 has been separated into symmetrically disposed opposite center wall portions 70 and 72 which are each connected at one end to outer wall 60 at attach points 74, and connected at the other end to inner wall 62 at attach points 76. With rotation about locus lines L wall portions 70 and 72 have been reshaped with uniform longitudinal rate of change to maintain constant equal areas for each duct means.

Figure 21:
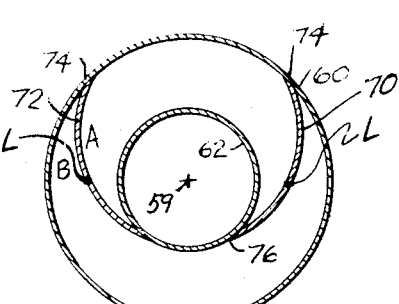

In FIG. 21 the opposite wall portions 70 and 72 have continued their rotations about locus lines L to remain symmetrically disposed. The attach points 74 on outer wall 60 have been shifted downwardly toward the center of the passageway. The wall portions are shaped to maintain constant and equal areas for the duct means A and B.

Figure 22:
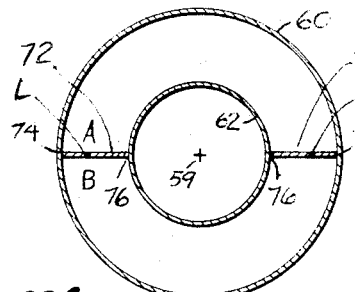

FIG. 22 shows the continued rotation of the wall portions 70 and 72 about locus lines L to the interface section which, as in previous embodiments is characterized by walls located along radial planes passing through the longitudinal centerline of the valve and extending radially entirely across the passageway. As noted in connection with previous embodiments, the forward and aft portions are relatively moveable and have identical matching interface sections wherein the first duct means A and the second duct means B each include $n/2$ segments of an annulus bounded by radially extending walls at each circumferential extremity. In the two passageway embodiments shown here, $n = 2$ and each duct means involves only a single passageway.

Figure 23:
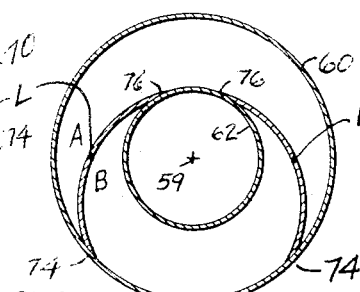

FIG. 23, taken at 23—23, is identical in section shape to the section shown in FIG. 21, but appears rotated angularly by $360°/n$, in this case $180°$ since the number of individual passageways, $n$, is equal to two. As in previous figures wall portions 70 and 72 pass through locus lines L and are faired longitudinally to obtain the desired shapes with minimum flow disturbances.

Figure 24:
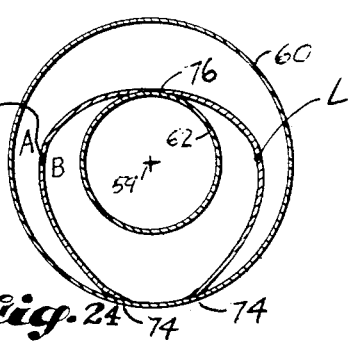
Figure 25:
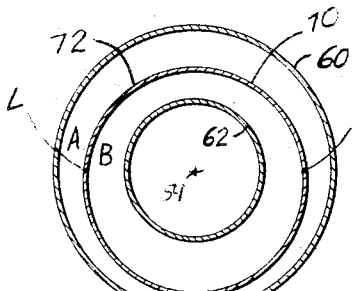
Figure 26:
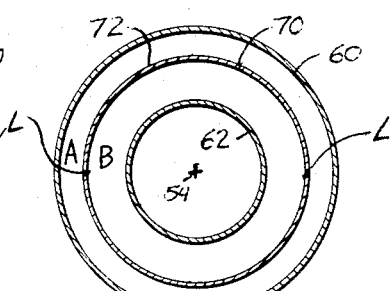

FIGS. 23, 24, and 25 show the transition of the shapes of the duct means A and B as they progress toward the exit plane shown in FIG. 26 wall rotation continuing about locus lines L. These sections are identical to those shown in FIGS. 21, 20, 19, and 18 respectively but are rotated angularly by $360°/n = 180°$, as explained in connection with the previous 16 passageway embodiment. Again, it is apparent that means for switching from inverted to straight through flow is variable here by mechanical rotation of the aft portion of the valve with respect to the forward portion by an amount equal to $360°/n$, in this case $180°$ to thereby align alternate passageways at the interface plane.

In the design of practical embodiments of the flow control passageways shown in this disclosure, it will be found that the inherent strength involved in integration of the duct structure as a pressure vessel will minimize weight penalties. Minor variations in surface contours, such as fillets and local fairings may be required to optimize internal fluid flow performance. Precisely constant area for the duct means is theoretically possible only with infinitely thin walls; however, normal wall thicknesses will not affect the area distribution significantly. Area variations of $\pm 5$ percent are tolerable for low losses, and significantly high losses will not occur until much higher area variations are encountered. For relatively thick wall ducts, for example those constructed of honeycomb sandwich material, passageway radial heights may be adjusted as required to minimize area deviations.

While the embodiments disclosed have each involved an overall annular passageway of uniform constant area, it will be recognized that the principles disclosed here are applicable to uniformly varying sections such as an annular conical frustum merely upon application of routine scaling expedients. Also, it is apparent that upon disclosure of the basic geometric concepts, persons skilled in mathematics and the mechanical arts will be able to apply the concepts to a wide variety of passageway shapes and flow control problems. In FIGS. 9 through 26, the locus lines L were used to demonstrate a method of construction involving rotation and reshaping of the wall portions 64' about the locus lines L. It should now be apparent that constant areas for each duct element may be established graphically by the use of a grid system centered about the locus point, which divides each area between centerlines of adjacent duct elements into smaller equal area segments, and by shaping the duct wall to divide these individual segmented areas such that the areas from the duct wall to the centerline of each adjoining duct element will be equal. Also, as noted earlier, where a valve capable of switching from inverted to straight through flow is not required, a flow control system for continuously inverting unequal area flow patterns may readily be constructed. In the case of such unequal flow patterns, the locus lines L will not be parallel to the longitudinal axis of the passageway.

Based on the foregoing, it is apparent that the flow control passageway system of this invention provides novel constant area intersecting flow ducts by dividing total flow into two duct means having a combined total cross-sectional area substantially equal to the cross-sectional area of the original passageway and inverting the relative position of the two ducts between the entrance and exit ends of the passageway. Further, it has been shown that, if desired, the passageway system may be provided with means for selectively switching from inverted to straight through flow, thereby creating in an annular passageway embodiment, an Annulus Inverting Valve.

Many variations of the preferred embodiments shown will occur to persons skilled in this art. The basic nesting duct element concepts disclosed are believed applicable to the solution of a wide variety of fluid control problems. Other expedients may be used for combining or joining the interface sections 44 in the Annulus Inverting Valve. For example, rather than providing means for relative rotation of the forward and aft portions 12 and 14 of valve 10, flow switching may be readily achieved in the multiple passageway embodiments by creating a longitudinal transition zone between stationary spaced-apart forward and aft portions in which conventional door type flapper valve means are used to switch flow between appropriate duct elements at the interface sections. In such an embodiment, the spaced-apart interface sections 44 would preferably be oriented in a circumferentially staggered fashion to minimize travel of the flapper valves. Such modifications to the embodiments shown are not considered to depart from the spirit and scope of the invention. Therefore, it is intended in the appended claims to cover all such variations and modifications.

What is claimed and desired to be secured by United States letters patent is:

1. A flow control system for inverting two flow patterns within a longitudinally extending annular fluid passageway comprising separate first and second duct means having adjacent annular cross-sections at the entrance end and the exit end of said passageway and having a combined total cross-sectional area substantially equal to the cross-sectional area of said annular fluid passageway; wherein the entrance cross-section of said first duct means is concentric with and surrounds the entrance cross-section of said second duct means; and wherein said first and second duct means are shaped and arranged to invert the flow pattern such that the exit cross-section of said second duct means is concentric with and surrounds the exit cross-section of said first duct means; thereby discharging two separate flow patterns at the exit end of said passageway in an annular adjacent relationship which is inverted from that existing at said entrance end of said annular fluid passageway.

2. The system of claim 1 comprising a circular inner wall and a circular outer wall defining the boundaries of said annular passageway, and center wall means for controlling the internal flow within said passageway; said center wall means forming first and second duct means having adjoining first and second duct elements; said first duct element having, at said entrance end, a cross-section extending radially between said inner wall and said center wall means; said second duct element having, at said entrance end, a cross-section adjoining said first duct element at said center wall means and extending radially therefrom to said outer wall; said first duct element having, at said exit end, a cross-section extending radially between said outer wall and said center wall means; said second duct element having, at said exit end, a cross-section adjoining said first duct element at said center wall means and extending radially therefrom to said inner wall.

3. The system of claim 2 wherein said first and said second duct means have substantially equal constant areas and wherein said center wall means includes a wall segment the opposite sides of which provide boundary surfaces for said two adjoining duct elements, said wall segment being continuously reshaped and rotated about a locus line which extends parallel to said longitudinal axis such that the cross-sectional areas of said adjoining duct elements will remain substantially equal along the longitudinal extent of said passageway.

4. The flow control system of claim 2 wherein the system is divided into separated forward and aft portions at a section intermediate said entrance and exit ends at which the duct elements have adjoining cross-sections extending radially entirely across the passageway; and wherein there is provided means for selectively switching flow patterns between adjoining duct elements of said forward and aft portions to thereby cause the flow control system to function as a valve means for switching from inverted to straight through flow.

5. The flow control system of claim 4 wherein said valve means comprises means for causing relative rotation between said forward and said aft portions to selectively realign next adjacent duct elements.

6. The system of claim 1 wherein said first and second duct means are separated by center wall means having wall segments the opposite sides of which provide boundary surfaces for said first and second duct means.

7. The system of claim 6 which includes duct elements characterized by cross-sectional shapes which make a smooth longitudinal transition from a segment of an annulus extending only partially across said passageway, downstream to a curvilinear section having at least three curved sides, and further downstream to a segment of an annulus extending only partially across said passageway.

8. The system of claim 7 wherein said cross-sectional shapes have a plane of symmetry extending along a radial plane passing through the longitudinal axis of said longitudinally extending annular fluid passageway.

9. The system of claim 8 wherein said duct element cross-sectional shapes maintain a substantially constant cross-sectional area along the length of said duct elements.

10. The system of claim 9 wherein there is provided a valve means for selectively switching the respective positions of said two separate flow patterns from their inverted positions to the same respective positions at each of said entrance and exit ends thereby discharging said two separate flow patterns at the exit end of said passageway in the same annular adjacent relationship which exists at the entrance end of said annular fluid passageway.

11. The system of claim 10 wherein said valve means includes actuator means for selectively displacing said center wall means.

12. A flow system for changing the relative positions of two separated adjacent flow patterns within the confines of a longitudinally extending fluid passageway having an area substantially equal to the combined total area of the two flow patterns at any location along the longitudinal extent of said passageway; said system comprising center wall means forming a first duct means having a first duct element and a second duct means having a second duct element; said first and second duct elements sharing a common wall segment of said center wall means, the opposite sides of said wall segment acting as boundary surfaces for said first and second duct elements; said wall segment being rotated and reshaped about a longitudinally extending locus line such that, at the entrance end of said passageway said first duct element has a cross-section extending from one side of said passageway to said wall segment, and said second duct element has a cross-section extending from said wall segment to the opposite side of said passageway; and at a longitudinal position located downstream from said entrance section said first and second duct elements have adjoining generally triangular cross-sections extending substantially across said passageway and separated by said wall segment which extends substantially across said passageway from said one side to said opposite side of said passageway.

13. The system of claim 12 wherein each of said first and second duct elements have cross-sectional areas which remain substantially constant at all locations along the longitudinal extent of said passageway.

14. The system of claim 12 wherein each of said first and second duct elements is characterized by a constant area cross-section making a smooth longitudinal transition from a generally rectangular entrance section, downstream to a generally pentagonal section, downstream to a generally triangular section, downstream to a generally pentagonal section, and further downstream to a generally rectangular section extending entirely across said passageway.

15. The system of claim 12 wherein said passageway has a circular configuration and each of said first and second duct elements is characterized by a constant area cross-section making a smooth longitudinal transition from a segment of an annulus extending only partially across said passageway, downstream to a five-sided section having three curved sides, downstream to a three-sided section having three curved sides, and downstream to a segment of an annulus extending entirely across said passageway.

16. The system of claim 12 wherein the cross-sectional area of said first duct means is substantially equal to the cross-sectional area of said second duct means at all locations along the longitudinal extent of said passageway.

17. The system of claim 16 wherein said first and second duct means extend integrally and continuously to said location at which a first and second duct elements have adjoining cross-sections extending entirely across said passageway, and wherein at said location said first and second duct means are sectioned into separate forward and aft portions each having identical interface cross-sections on opposite sides of said location, and wherein said system includes valve means for selectively switching flow patterns between adjoining duct elements of said forward and aft portions to thereby causes said system to function as a valve means for switching from inverted to straight through flow.

18. The system of claim 17 wherein said valve means comprises means for causing relative movement between said forward and aft portions to selectively realign next adjacent duct elements.

19. A flow control system comprising means for inverting the respective positions of two separate flow patterns between the entrance and exit ends of said system within the confines of a passageway having a cross-sectional area substantially equal to the combined area of said two flow patterns; and means for switching the respective positions of said two flow patterns from their inverted positions to the same respective positions at each of said entrance and exit ends such that flow passes straight through said system.

20. The system of claim 19 wherein boundaries of said system are defined by two oppositely facing walls and the boundaries of said two separated flow patterns are defined by central wall means; and wherein said means for switching includes means for selectively moving said central wall means to cause either inverted or straight through flow.

21. The system of claim 20 which includes duct elements characterized by generally rectangular cross-sections at said entrance end, generally three-sided cross-sections intermediate said ends, and generally rectangular sections at said exit end.

22. The system of claim 20 wherein the oppositely facing walls are circular in shape and said system includes duct elements characterized by cross-sections which are segments of an annulus at said entrance end, are curvilinear sections having three curved sides intermediate said ends, and are segments of an annulus at said exit end.

23. A flow control system comprising: a plurality of basic duct elements located within a longitudinally extending passageway defined by oppositely facing first and second walls for establishing individual flow patterns characterized by substantially constant cross-sectional areas, and cross-sectional shapes which make a smooth gradual transition from a generally rectangular section extending only partially across the passageway from one of said walls of said passageway at the entrance end of the flow pattern, to a generally three-sided section, and then to a generally rectangular section extending partially across the passageway from the opposite wall of said passageway.

* * * * *